Aug. 9, 1949.   J. P. CUTRER   2,478,525
WELDING GUN ADAPTER
Filed Dec. 15, 1947
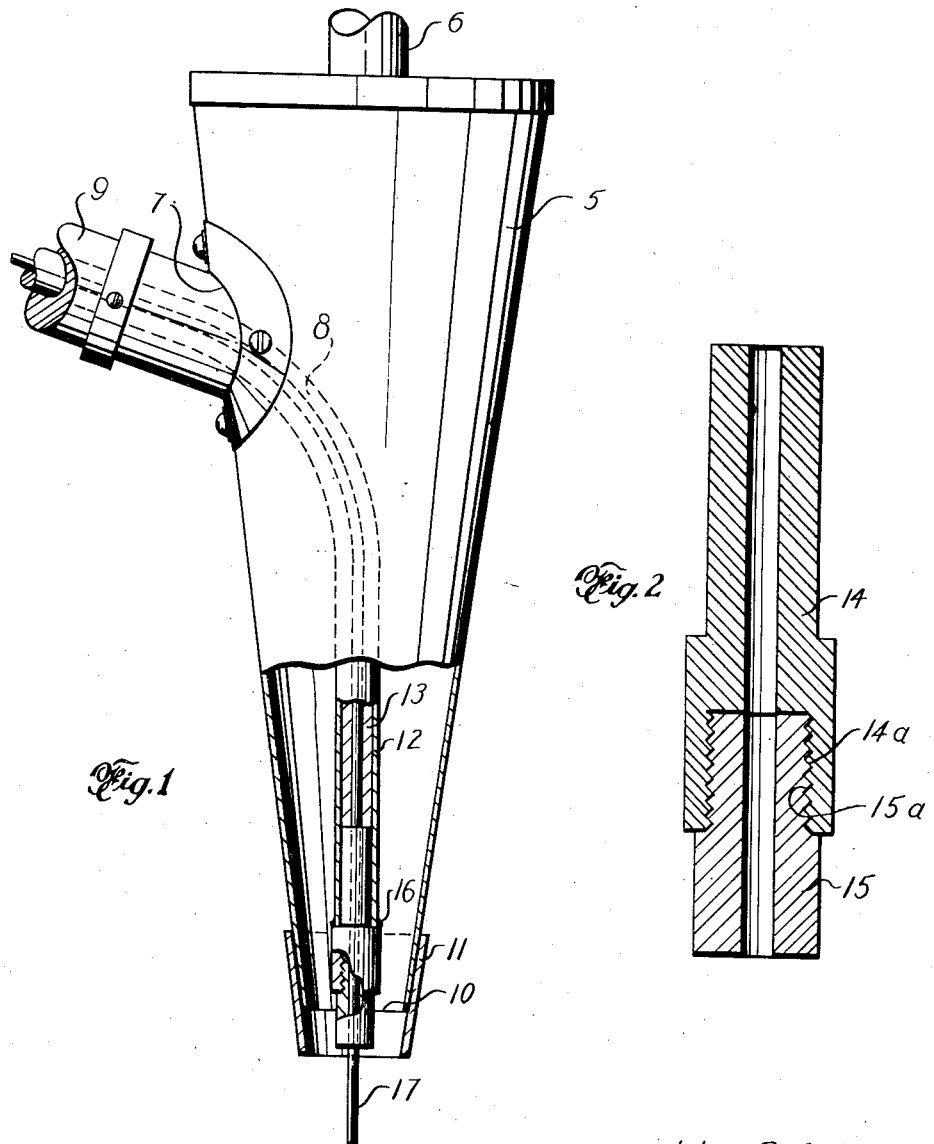
John P. Cutrer
INVENTOR.

Patented Aug. 9, 1949

2,478,525

UNITED STATES PATENT OFFICE 2,478,525

WELDING GUN ADAPTER

John P. Cutrer, Houston, Tex., assignor to Reed Roller Bit Company, Houston, Tex., a corporation of Texas Application December 15, 1947, Serial No. 791,912

3 Claims. (Cl. 219—8)

This invention relates to improvements in semi-automatic welding machines and refers more particularly to the welding machine gun and the electrode holding conduit of the gun.

In welding guns of welding machines of this type the welding rod is advanced through the rod holding conduit at a predetermined rate and the outlet end of the conduit is disposed just within the flux dispensing opening in the gun casing so that the electrode rod extends through the opening. The end portion of the conduit is subject to rather rapid wear and also in operation the welding rod frequently becomes welded to the tip element. For these reasons it is frequently necessary to change the rod holding conduit of the gun. In order to do this it is necessary to disassemble the gun and to break the silver solder connection of the end element from the cable and solder a new element in its place. The complexity of this operation is annoying and is time and labor consuming.

An object of this invention is to provide a welding gun for semi-automatic welding machines having a wear tip element for the rod holding conduit that may be readily replaced without dismantling the gun.

Another object is to provide a welding gun for a semi-automatic welding machine wherein the rod holding conduit need not be removed from the gun over a prolonged period of operation.

A further object is to provide an end member which may be secured to the end of an electrode rod holding conduit, the end member adapted to releasably receive a wear tip element.

Still another object is to provide a tip assembly for an electrode rod holding conduit, made up of a plurality of parts one of which may be semi-permanently secured to the electrode rod and another part of the assembly being releaseably secured to the first of these parts, permitting ready interchanging of the releasable part.

Other and further objects of this invention will appear as the specification proceeds.

In the accompanying drawings which form a part of the instant specification, are to be read in conjunction therewith, and wherein like reference numerals are used to indicate like parts in the various views;

Fig. 1 is a side elevation, with parts shown in section, of a welding gun embodying this invention; and Fig. 2 is an enlarged sectional view of the tip assembly.

Referring to the drawings, numeral 5 designates the welding gun casing having a connection 6 at its upper end through which flux may be fed into the casing. The gun has a lateral fitting 7 for receiving the electrode holding conduit 8. Around the conduit 8, exteriorly of the gun, is an insulated handle 9. The casing has a botton flux dispensing opening 10 and at the lower end surrounding this opening is a sleeve 11 which is removably secured thereto and held in place upon the casing by friction. The purpose of this sleeve is to render access to the tip assembly of the electrode rod conduit.

Having described the major component parts of the gun, which are essentially conventional, reference is now had to the rod holding conduit wherein the novelty of the invention primarily resides. The conduit 8 which may be a flexible tubing assembly is illustrated as formed of an outer tube 12 which may be of copper and an inner rod holding tube 13 which preferably is made of steel. It will be observed that the inner tube 13 terminates within the casing with its end spaced from the flux dispensing opening and has a passageway for accommodation of an electrode rod.

The tip assembly of the conduit 8 is made up of the tubular block 14 and tip element 15. The tubular block 14 may be made of brass and has a portion of reduced external diameter adapted to mate in the lower end of tube 12. Usually it is preferable to silver solder the tubular block 14 to the tube as indicated at 16. In this manner the tubular block 14 is rigidly secured to conduit 8 but may be removed therefrom when necessary.

Wear tip element 15 is releasably secured to the tubular block 14. This connection preferably is provided by the threaded portion 14a of the tubular block and the corresponding threaded section 15a of the tip element.

The tubular block 14 and tip element 15 have a continuous passageway which communicates with the passageway through the inner rod holding tube 13 to accommodate feeding of the electrode rod through the conduit 8. The length of the tip element 15 is sufficient to absorb all lateral play or movement of the electrode rod during use so that substantially all wear of the tip assembly takes place in the tip element well below the junction of the passageway between the tubular block 14 and element 15. The element 15 is then subjected only to relative sliding movement of the rod and there is little tendency for wear. However, in use the passageway adjacent the outlet of tip element 15 will be worn whereby in cross section the passageway will become oval or egg shaped adjacent its outlet end. When this wear has progressed to an objectionable degree, tip element 15 may be readily released from the tubular block 14 and a new element placed therein.

In operation when it becomes necessary to replace the tip element either due to wear or due to the electrode rod becoming welded to the element, as sometimes occurs, sleeve 11 is removed from the casing to provide ready access to the tip element. Due to the releaseable connection between the tubular block 14 and element 15 this connection may be easily broken and a new tip element releasably secured to tubular block 14. It has been found that in the event the electrode rod 17 should become welded to the tip element 15 there is sufficient flexibility in the rod to permit ready release of the tip element where the threaded connection is used. Then the electrode rod 17 is cut and a new element 15 is inserted over the rod and fitted to the tubular block 14.

It will be seen that the objects of this invention have been accomplished. There has been provided a welding gun adaptable for use with semi-automatic welding equipment wherein the end element of the electrode rod-holding conduit may be readily interchanged. The arrangement is such that this change may be made without requiring the removal of the rod holding conduit from the gun casing to materially save time and effort. The construction is such that the tip assembly has one part secured to the rod holding conduit in a semi-permanent fashion and a tip element is provided with releasable connection with this member.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having described my invention, I claim:

1. An electrode rod holder including, a tubular conduit assembly comprising an outer protective tubing and an inner rod holding tube extending through the tubing and terminating short of one end thereof, a tubular block secured to the end of the outer tubing and having a reduced shank insertable within the bore of the outer tubing and adapted to abut the end of the inner rod holding tube, said block having the upper end of its bore of substantially the same diameter as the bore of the rod-holding tube and forming a continuation thereof and a tip element removably connected by threads to the block and having an axial bore communicating and aligned with the upper portion of the bore of the block and of substantially the same diameter as said upper portion of the block bore so that when said element is in connected position the bores of the tip element, block and tube form a continuous passage of constant diameter, whereby an electrode rod may extend through the rod holding tube, block and tip element and may project outwardly in advance of the latter.

2. An electrode rod holder including, a tubular conduit assembly comprising an outer protective tubing and an inner rod holding tube extending through the tubing and terminating short of one end thereof, a tubular block secured to the end of the outer tubing and having a reduced shank insertable within the bore of the outer tubing and adapted to abut the end of the inner rod holding tube, the upper end of the bore of the block communicating with and being of the same diameter as the bore of the rod holding tube, with the lower end of the block bore being enlarged and formed with internal threads, and a tubular tip member having its upper portion threaded into the enlarged lower end of the bore of the block and having an axial bore communicating with the upper portion of the bore of the block and with the bore of the inner rod holding tube, the bore of said tip element, the upper portion of the bore of the block and the bore of the inner rod-holding tube forming a continuous passage of constant diameter, whereby an electrode rod may extend through the inner tube, block and tip member and project outwardly in advance of the latter.

3. An electrode rod holder as set forth in claim 2, wherein the tip member is of sufficient length to take any wear occasioned by lateral stresses on the electrode rod during the welding operation, and thereby protect the block and inner tube from lateral wear due to said stresses.

JOHN P. CUTRER.

REFERENCES CITED

The following references are of record in the file of this patent:

UNITED STATES PATENTS

| Number | Name | Date |
| --- | --- | --- |
| 1,853,609 | Goodspeed | Apr. 12, 1932 |
| 1,875,483 | Naylor | Sept. 6, 1932 |
| 2,068,166 | Dodge | Jan. 19, 1937 |
| 2,211,424 | Holslag | Aug. 13, 1940 |

FOREIGN PATENTS

| Number | Country | Date |
| --- | --- | --- |
| 394,773 | Great Britain | July 6, 1933 |